United States Patent
Larcher et al.

(10) Patent No.: US 10,510,497 B2
(45) Date of Patent: Dec. 17, 2019

(54) REMOVABLE ELECTRIC CURRENT SWITCHING ELEMENT AND ELECTRICAL SWITCHGEAR FOR SWITCHING AN ELECTRIC CURRENT COMPRISING SUCH A REMOVABLE SWITCHING ELEMENT

(71) Applicant: Schneider Electric Industries SAS, Rueil Malmaison (FR)

(72) Inventors: Patrick Larcher, Echirolles (FR); Patrick Comtois, Saint Ismier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 15/944,055

(22) Filed: Apr. 3, 2018

(65) Prior Publication Data

US 2018/0337007 A1 Nov. 22, 2018

(30) Foreign Application Priority Data

May 17, 2017 (FR) ...................... 17 54351

(51) Int. Cl.
*H01H 9/30* (2006.01)
*H01H 9/34* (2006.01)
(Continued)

(52) U.S. Cl.
CPC .............. *H01H 9/302* (2013.01); *H01H 1/58* (2013.01); *H01H 9/346* (2013.01); *H02B 1/26* (2013.01); *H01H 2001/001* (2013.01)

(58) Field of Classification Search
CPC ...... H01H 9/346; H01H 9/362; H01H 50/048; H01H 1/58; H01H 9/302; H01H 2001/001; H01H 50/546; H02B 1/26
(Continued)

(56) References Cited

U.S. PATENT DOCUMENTS

2003/0001700 A1* 1/2003 Comtois .............. H01H 50/045
335/9
2009/0237191 A1 9/2009 Yano et al.
(Continued)

FOREIGN PATENT DOCUMENTS

EP 2 019 405 A1 1/2009
EP 2 648 204 A1 10/2013
(Continued)

OTHER PUBLICATIONS

French Preliminary Search Report dated Feb. 12, 2018 in French Application 17 54351 filed on May 17, 2017 (with English Translation of Categories of Cited Documents and Written Opinion).

*Primary Examiner* — Edwin A. Leon
(74) *Attorney, Agent, or Firm* — Oblon, McClelland, Maier & Neustadt, L.L.P.

(57) ABSTRACT

A removable electric current switching element includes a housing including a first bottom plate and a second bottom plate opposite to one another. The housing includes insulating walls which extend around electrically mobile contacts from the second bottom plate and in a direction perpendicular to the second bottom plate. The housing also includes protection walls which at least partially cover internal faces of the insulating walls, these protection walls being formed of a single piece with the second bottom plate.

9 Claims, 4 Drawing Sheets

(51) Int. Cl.
  *H01H 1/58* (2006.01)
  *H02B 1/26* (2006.01)
  *H01H 1/00* (2006.01)
(58) Field of Classification Search
  USPC .......................................................... 200/293
  See application file for complete search history.

(56) References Cited

U.S. PATENT DOCUMENTS

| | | | |
|---|---|---|---|
| 2010/0079973 A1* | 4/2010 | Brandt | H01H 9/04 |
| | | | 361/837 |
| 2011/0114602 A1 | 5/2011 | Bush et al. | |
| 2013/0234813 A1 | 9/2013 | Imamura et al. | |
| 2014/0101937 A1 | 4/2014 | Imamura et al. | |
| 2014/0104018 A1 | 4/2014 | Imamura et al. | |
| 2014/0104019 A1 | 4/2014 | Imamura et al. | |

FOREIGN PATENT DOCUMENTS

| | | |
|---|---|---|
| EP | 2 936 529 | 10/2015 |
| WO | WO 2014/096583 A1 | 6/2014 |

\* cited by examiner

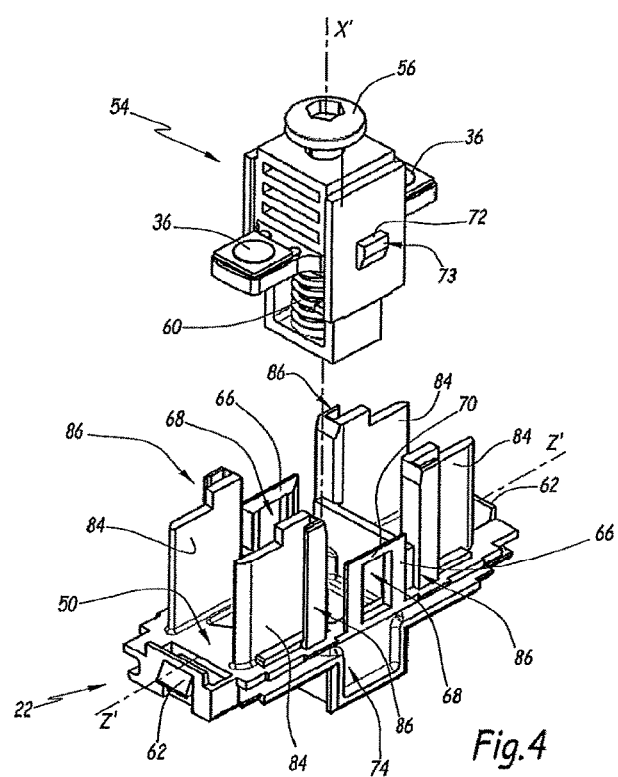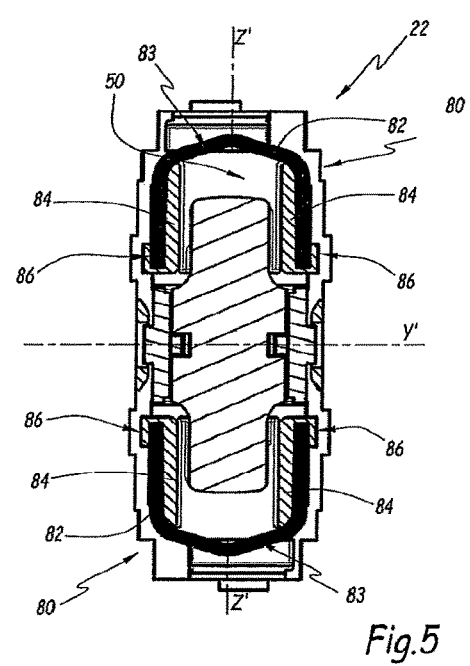
Fig.4
Fig.5

# REMOVABLE ELECTRIC CURRENT SWITCHING ELEMENT AND ELECTRICAL SWITCHGEAR FOR SWITCHING AN ELECTRIC CURRENT COMPRISING SUCH A REMOVABLE SWITCHING ELEMENT

The invention relates to a removable electrical switching element for an electrical switchgear. The invention also relates to an electrical switchgear for switching an electric current comprising such a removable switching element.

Electrical devices for switching an electric current, such as contactors, are known, these devices including one or more removable switching elements that are inserted into housings in a baseplate of the device. These removable elements are sometimes known as switching bulbs. Such a removable element is, for example, described in document FR 2 999 790.

Generally, each removable element is connected to connection lands of the electrical device and acts to selectively interrupt the flow of an electric current between these lands. To do this, each removable element includes separable electrical conductors, the movement of which is controlled by a dedicated actuator moving them between an open position and a closed position with respect to the fixed electrical contacts to interrupt or, respectively, to allow the flow of the electric current.

One advantage of such removable elements is that they are interchangeable and therefore easy to replace during maintenance operations or in the event of malfunction.

However, these known removable elements are not entirely satisfactory. In particular, when the electrical contacts are separated while an electric current is flowing, an electric arc appears between these contacts. The electric arc ionizes the ambient air and gives rise to breaking gases, which must be cooled and removed from the switching element, via removal channels specially made for this purpose. Certain known removable elements exhibit insufficient tightness in this regard, which may lead to the escape of insufficiently cooled breaking gases and promote undesirable re-arcing between the connection lands. The safety of the switching device is then decreased.

It is these drawbacks which the invention more particularly aims to overcome, by providing a removable electric current switching element for an electrical switchgear, this removable element exhibiting improved tightness with respect to breaking gases.

To this end, the invention relates to a removable electric current switching element comprising:
 a housing provided with a first bottom plate and a second bottom plate which are opposite one another;
 fixed electrical contacts, which are rigidly connected to the first bottom plate;
 electrically mobile contacts that can be moved with respect to the fixed electrical contacts, these mobile contacts being borne by a movable contact holder that can be moved in translation with respect to the second bottom plate;
 the housing comprising insulating walls which extend around the electrically mobile contacts from the second bottom plate and along a direction that is perpendicular to the second bottom plate.

According to the invention, the housing further includes protection walls which at least partially cover inner faces of the insulating walls, these protection walls being formed as a single piece with the second bottom plate.

By virtue of the invention, by forming the protection walls as a single piece with the second bottom plate, the tightness of these walls, as well as the tightness of the insulating walls, is improved. Breaking gas leakages are therefore limited. By virtue of this good level of tightness, the breaking gases are preferentially removed via the removal channels, and thus the risk of loopback of an electric current outside the removable element is limited.

According to some advantageous but non-mandatory aspects of the invention, such a removable element may incorporate one or more of the following features, either alone or in any technically permissible combination:
 The protection walls include folded-over edges which surround the ends of the insulating walls along the direction that is perpendicular to the second bottom plate.
 The housing includes a first part and second part which are distinct from one another, the first housing part including the first bottom plate, the second housing part including the second bottom plate and accommodating the movable bridge, the first and second housing parts being able to be separated from one another.
 The first and second housing parts can be separated and include complementary attachment members for rigidly connecting the first and second housing parts to one another.
 The second housing part includes a guiding portion which allows the movable contact holder to move in translation, the guiding portion including, for this purpose, a rectilinear window made in a side wall of the first housing part and including at least one hook borne by the movable bridge, this hook being inserted into the window.
 The protection walls are made in a gasogenic material.
 The second bottom plate contains at least one channel for removing breaking gases, which fluidically connects an inlet opening, in communication with a volume delimited by the insulating walls inside the housing, to an outlet opening, in communication with the exterior of the housing.
 The protection walls extend over the entire height of the insulating walls, along the direction that is perpendicular to the second bottom plate.
 The insulating walls are at least partly formed by a blow piece attached to the second bottom plate.

According to another aspect, the invention relates to an electrical switchgear for switching an electric current comprising a baseplate including one or more housings and a removable electric current switching element, intended to be accommodated in one of the housings of the baseplate, such that the fixed electrical contacts of the removable switching element are electrically connected to connection lands of the switchgear, the removable switching element being such as described above.

The invention will be better understood and other advantages thereof will become more clearly apparent in the light of the following description of one embodiment of a removable switching element provided solely by way of example and with reference to the appended drawings, in which:

FIG. 4 is a schematic representation, in an exploded perspective view, of a second part of the removable switching element of FIGS. 1 to 3;

FIG. 5 is a schematic representation, in a front view, of the second housing part of the removable switching element of FIG. 4.

FIG. 1 shows an electrical switchgear 2 for switching an electric current, such as an industrial contactor. The electrical device 2 is for example intended to be connected to an electrical power supply line for supplying power to an electric motor.

Figure 1:
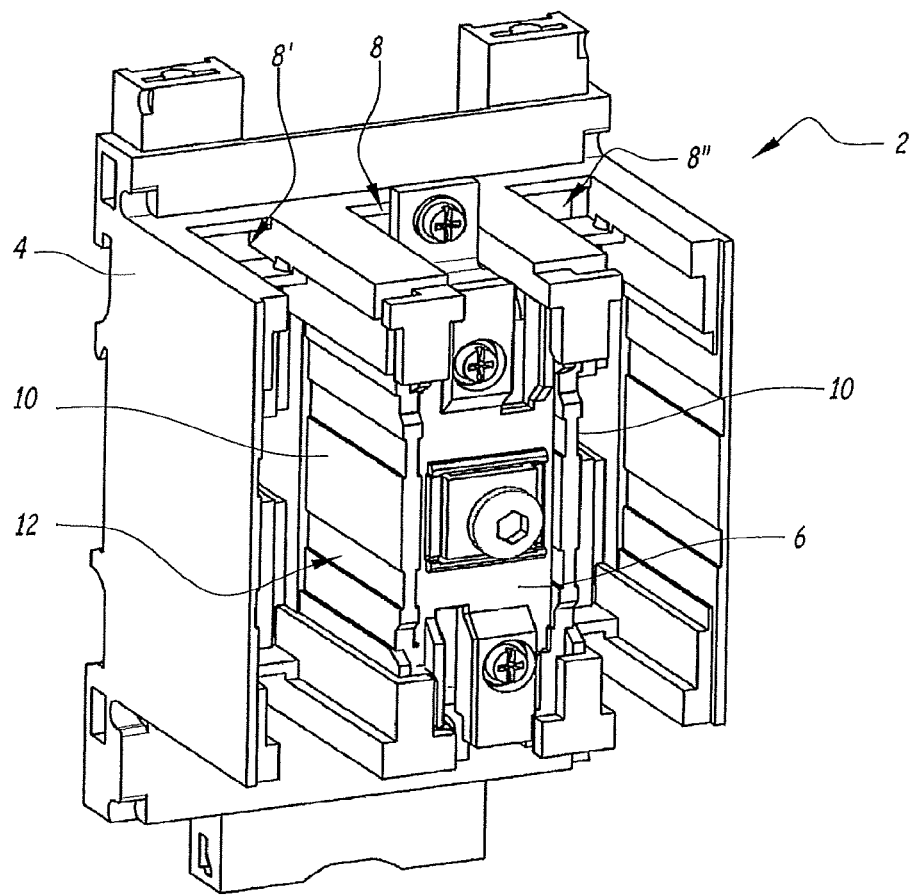
FIG. 1 is a schematic representation, in perspective, of an electrical switchgear including a removable switching element in accordance with the invention.

The function of the electrical device 2 is to selectively interrupt an electric current flowing through one or more current conductors, for example a polyphase AC electric current.

The electrical device 2 includes here a baseplate 4, for example intended to be installed in an electrical switchboard, and one or more removable electric current switching elements 6, here referred to as "switching bulbs". Each removable element 6 is suitable for interrupting an electric current, for example one electrical phase of a polyphase current.

The electrical device 2 also includes a controllable actuator (not shown) that is intended to be accommodated on a front face of the baseplate 4 to control the removable elements 6.

In this illustrative example, the electrical device 2 is suitable for interrupting a three-phase current including three electrical phases, and is therefore suitable for accommodating three removable elements 6, each associated with one of these electrical phases.

The baseplate 4 includes here housings 8, 8' and 8", numbering three and being identical to one another, each being suitable for accommodating a removable element 6. The housings 8, 8' and 8" are therefore complementary in shape to the removable elements 6.

The housings 8, 8' and 8" are here separated pairwise by separating walls 10 which are preferably made of an electrically insulating material, such as a plastic material. The separating walls 10 include here grooves 12 for guiding the insertion of the removable element 6.

As a variant, the number of removable elements 6 may be different. The baseplate 4 is then adapted accordingly.

To simplify FIG. 1, only one example of the removable element 6 is illustrated. In this example, the removable elements 6 are identical to one another. The removable element 6 is illustrated accommodated inside the housing 8.

Figure 2:
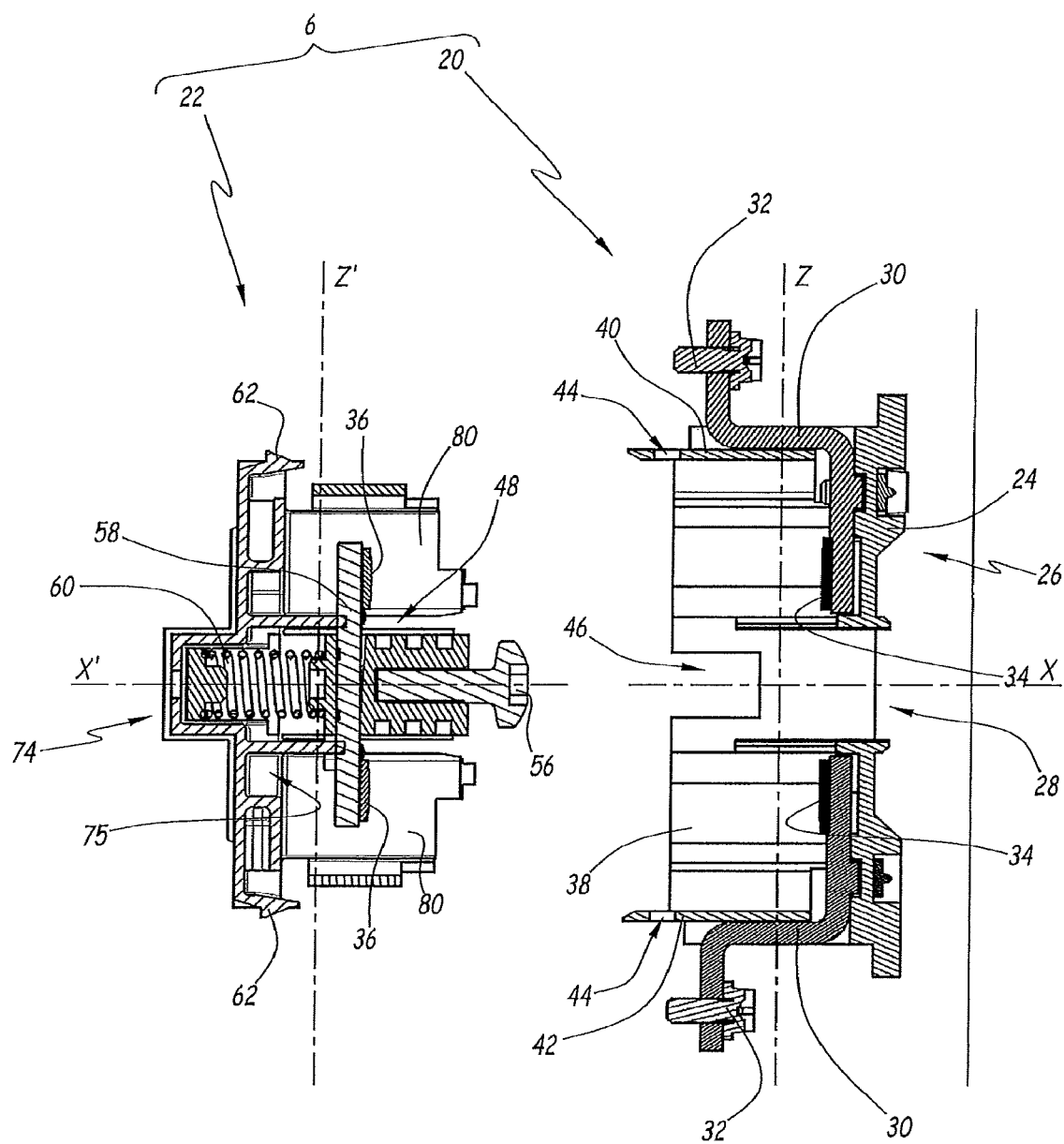
FIG. 2 is a schematic representation, in a longitudinal section, of first and second parts of the removable switching element of FIG. 1 separated from one another.
Figure 3:
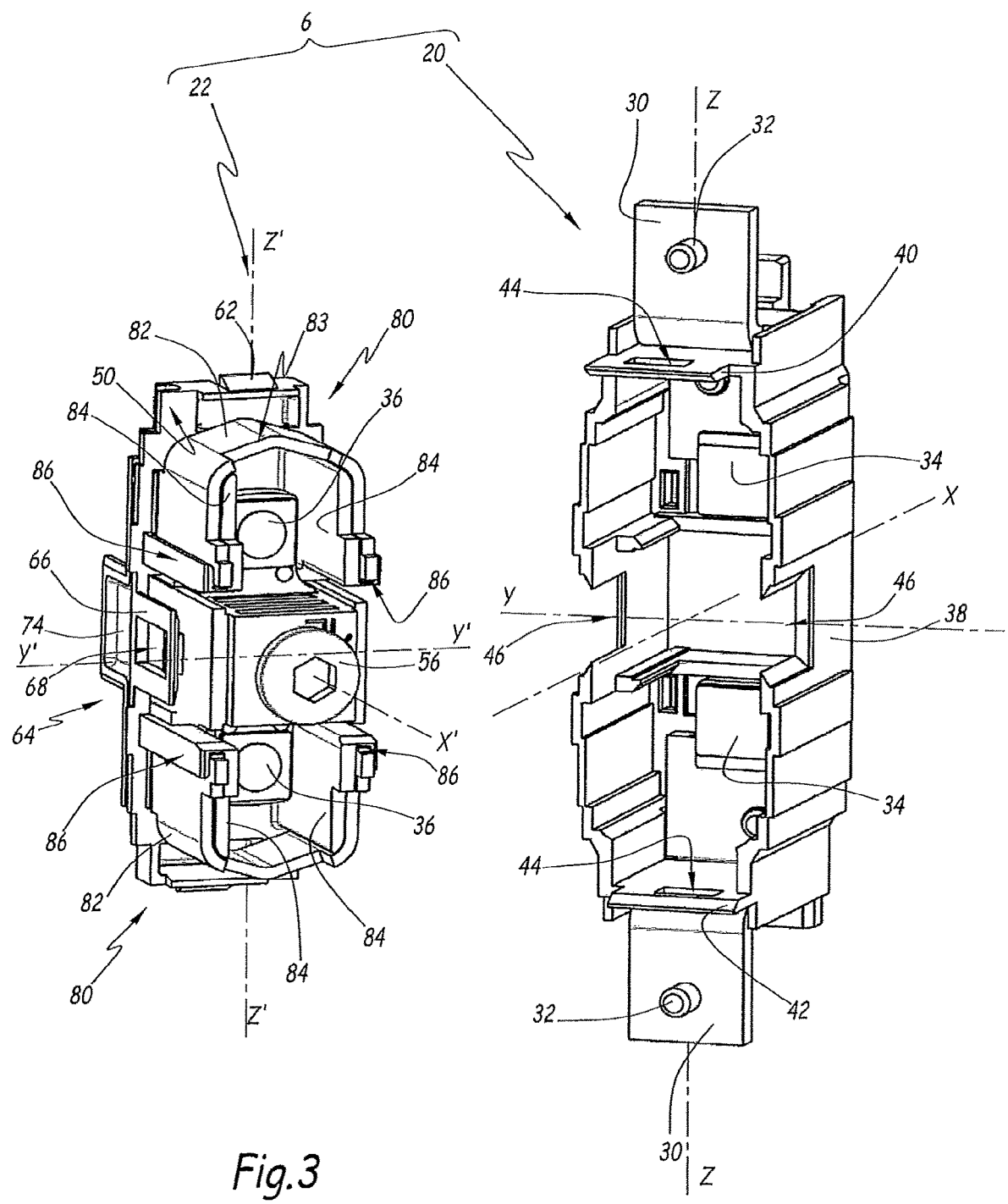
FIG. 3 is a schematic representation, in an exploded perspective view, of the electrical switching element of FIGS. 1 and 2.

As illustrated in FIGS. 2 and 3, the removable element 6 includes a housing formed of a first part 20 and of a second part 22. These first and second parts 20, 22 are here distinct and can be separated from one another, as explained in greater detail below.

The first part 20, also referred to as the front part, includes a first bottom plate 24, which forms an essentially planar front face 26 of the removable element 6. The front face 26 is provided with a through window 28.

The front part 20 further includes connection terminals 30, which are attached to the bottom plate 24 and which are intended to be connected to electrical connection lands of the device 2, so as to connect the removable element 6 to an electrical circuit. These terminals 30 here number two and are electrically isolated from one another.

For example, the terminals 30 extend from the interior of the front part 20 to the exterior thereof, and are held fixed to the connection lands by means of retaining screws 32. These terminals 30 include fixed electrical contacts 34, which are intended to cooperate with electrically mobile contacts 36 of the removable element 6. These fixed contacts 34 are here accommodated inside the front part 20.

In this example, the front part 20 takes the shape of an oblong extending along a longitudinal axis Z. The axis Z corresponds here to a vertical direction when the removable element 6 is accommodated inside the baseplate 4. For example, the two terminals 30 extend in parallel to this axis Z.

"X" denotes an axis that is perpendicular to the front face 26 and to the longitudinal axis Z of the front part 20. "Y" denotes a transverse axis of the front part 20, this transverse axis Y being perpendicular to the axes X and Z.

The front part 20 includes here side walls 38 which extend in parallel on either side of a longitudinal median plane of the front part 20, perpendicularly to the axis Y. The side walls 38 are here provided with lateral voids 46.

Additionally, the front part 20 includes upper 40 and lower 42 walls, which extend in parallel to a transverse median plane that is parallel to the axes X and Y. These walls 40 and 42 bear here attachment members 44, the role of which is described in greater detail below.

The inner volume delimited by the walls 38, 40 and 42 of the front part 20 is denoted by "48".

As illustrated in FIGS. 2 to 5, the rear part 22 of the housing includes a second bottom plate 50, which forms here an essentially planar back face 52 of the removable element 6.

In an assembled configuration of the removable element 6, the rear part 22 is accommodated inside the volume 48 of the front part 20. The bottom plates 24 and 50 are then opposite and facing one another.

In this embodiment, the front 20 and rear 22 parts can be reversibly separated from one another, preferably when the removable element 6 is located outside the baseplate 4. This allows in particular an operator to inspect the electrical contacts 34, 36 to evaluate their wear, for example during preventative maintenance operations.

As a variant, however, the parts 20 and 22 may be permanently welded to one another.

The rear part 22 takes the shape of an oblong which extends along a longitudinal axis Z'. In FIG. 3, "X'" denotes an axis that is perpendicular to the axis "Z'" and to the back face 52. Additionally, "Y'" denotes a transverse axis that extends perpendicularly to the axes X' and Z'.

In the assembled configuration of the removable element 6, the axes Z and Z' are merged with one another. The same applies for the axes X and X' and for the axes Y and Y'.

The rear part 22 includes the mobile contacts 36. These mobile contacts 36 here number two and are electrically connected to one another.

In the assembled configuration of the removable element 6, the mobile contacts 36 are positioned facing the corresponding fixed contacts 34. The mobile contacts 36 are selectively and reversibly movable with respect to the fixed contacts 34, between an open position and a closed position, which are distinct from one another. This movement is here performed by translation along a direction of movement that is parallel to the axis X'.

In the open position, the electrical contacts 34 and 36 are away from one another and are thus electrically insulated from one another by the ambient air. In the closed position, each of the contacts 34 makes contact with a corresponding movable contact 36, allowing an electric current to flow between the two terminals 30.

To allow this movement, in this example, the rear part 22 includes a movable contact holder 54 that can be moved in translation along the axis X' with respect to the bottom plate

50. This movable contact holder 54 includes a gripping member 56 and an electrically conductive element 58, which are together referred to as a movable bridge, here in the shape of a plate, which connects the mobile contacts 36 to one another.

The gripping member 56 is intended to be mechanically coupled to the actuator of the switchgear 2, to drive the movement of the mobile contacts 36 between the open and closed positions. In the assembled configuration of the removable element 6, the window 28 allows the passage of the gripping member 56.

For example, the movable contact holder 54 includes a body made of an electrically insulating material which is rigidly connected to the element 58 and to which the gripping member 56 is attached. The gripping member 56 is here a screw head.

The movable contact holder 54 also includes an elastic return member 60, such as a helical spring, which is arranged to exert a return force on the movable bridge 58, along the direction of movement X', so as to return the mobile contacts 36 to the open position when no force is exerted by the actuator of the device 2.

By way of illustrative example, the mobile contacts 36 are here positioned on either side of the movable bridge 58 along the axis Z', this movable bridge 58 occupying a central position within the rear part 22.

In this embodiment, the rear part 22 also includes attachment members 62, which are intended to cooperate with the attachment members 44 borne by the front part 20. These attachment members 44, 62 allow the parts 20 and 22 to be reversibly rigidly connected to one another.

Thus, the parts 20 and 22 can easily be separated from one another by an operator, for example to visually inspect the interior of the removable element 6, and they can then be just as easily assembled back together. This facilitates the maintenance of the removable element 6 and of the electrical device 2.

For example, the members 44 and 62 allow attachment by snap-fastening. The member 44 is here a female member, such as an opening, while the member 62 is a male member, such as a deformable hook, here formed as a single piece with the bottom plate 50. As a variant, the members 44 and 62 are male and female members, respectively.

In this example, the rear part 22 also includes a guiding portion 64, which allows the movable bridge 54 to move in translation along the direction of movement X'.

The guiding portion 64 is here formed level with the side walls 66 of the rear part 22. The side walls 66 extend here on either side of the movable contact holder 54 along directions that are parallel to the axes X' and Z'.

In the assembled configuration, the side walls 66 are accommodated in the lateral voids 46. It is therefore understood that the shape of the side walls 66 and of the lateral voids 46 are chosen so as to be complementary.

The lateral walls 66 are here planar in shape and include an oblong opening 68, or window 68, extending along the axis X' and forming a guide rail. The opening 68 is delimited by edges 70 which form an end stop limiting the movement of the movable contact holder 54 along the axis X' with a predefined travel.

Complementarily, the movable contact holder 54 includes hooks 72 which are accommodated inside the opening 68. These hooks 72 include for example a sloped edge 73 that is intended to facilitate their insertion into the opening 68.

The bottom plate 50 also includes a channel 74 for removing breaking gases. The function of the channel 74 is to allow breaking gases to cool and to allow them to be conveyed out of the removable element 6.

In a known manner, when the electrical contacts 34 and 36 are separated in the presence of an electric current, an electric arc appears which ionizes the ambient air, giving rise to a breaking gas. The temperature of this breaking gas is high and it should, preferably, be cooled before being expelled from the assembly 6. Specifically, this breaking gas is electrically conductive when it is hot. If it is expelled from the removable element 6 without being sufficiently cooled, it may lead to a risk of loopback of the electric current, i.e. a short circuit, between the connection lands of the device 2, which is dangerous and obviously not desirable.

Thus, the second bottom plate 50 advantageously contains at least one channel 74 for removing the breaking gases, which fluidically connects an inlet opening, in communication with the interior of the front part 20, to an outlet opening, in communication with the exterior of the housing. The interior of the front part 20 corresponds here to the face of the bottom plate 50 which faces away from the back face 52, i.e. which faces towards the front part 20 when the assembly 6 is in the assembled configuration.

This removal channel 74 may include baffling (not illustrated) that is intended to extend the trajectory of the breaking gas so as to promote its cooling.

For example, the channel 74 is in communication with an outer face of the bottom plate 50. The bottom plate 50 includes one or more inlet openings of this channel 74, as explained below.

The rear part 22 also includes insulating walls 80. These walls 80 extend from the bottom plate 50, here in the direction X'. These insulating walls 80 at least partially surround the electrical contacts 36. In this example, the insulating walls 80 number two, each surrounding one of the mobile contacts 36. The insulating walls 80 are here positioned on either side of the movable bridge 54. In this example, the walls 80 are identical and are positioned symmetrically with respect to the movable bridge 54.

Each insulating wall 80 delimits a volume forming an arc extinguishing chamber around the corresponding movable contact 36. Preferably, the height of the insulating walls 80, measured in parallel to the axis X', is greater than or equal to the travel of the movable bridge 54 along the axis X'.

The removal channel 74 includes here an inlet opening in each of these arc extinguishing chambers. As a variant, the bottom plate 50 may also include multiple channels 74, each having one inlet opening associated with just one of the arc extinguishing chambers.

As illustrated in FIGS. 4 and 5, the insulating walls 80 are here each at least partly formed by a piece 82, referred to as a "blow piece", which is attached to the bottom plate 50. In this example, the bottom walls 80 are entirely formed by the piece 82, such that what is described with reference to these insulating walls 80 also applies to the piece 82.

The blow piece 82 is made of a magnetic material, for example a ferromagnetic material, and its function is to promote the blow, i.e. the extinction, of an electric arc that forms level with the corresponding movable contact 36. The piece 82 exerts a magnetic field which guides the electric arc towards a particular area of the arc extinguishing chamber.

Each blow piece 82 here takes the shape of a U. More specifically, the base of this piece 82 here takes the shape of a U, the piece 82 extending by translation from this base in parallel to the axis X'. The piece 82 includes two opposite identical side partitions which are placed on either side of the corresponding movable contact 36, and extend perpendicularly to the axis Y' and in parallel to the axes X' and Z' and hence perpendicularly to the bottom plate 50. These side partitions are connected to one another by a curved partition rising in parallel to the axis X' and forming a bottom 83 of the U shape of the piece 82. The side partitions also include end edges, which are located opposite to the curved partition and extend in parallel to the axis X'. In the following, the "end edges" of the side partitions of the piece 82 correspond to the end edges of the corresponding insulating wall 80.

The housing of the removable element 6 also includes protection walls 84, which at least partially cover the inner faces of the insulating walls 80, here level with the opposite side partitions. The term "inner faces" refers to the faces of the insulating walls 80 which face towards the corresponding movable contact 36. These inner faces correspond here to the inner faces of the side partitions of the piece 82.

Preferably, these walls 84 extend over the entire height of the walls 80, this height being defined here along the axis X'.

These protection walls serve in particular to protect the insulating walls, and hence the pieces 82, from damage caused by the electric arc.

The protection walls 84 are formed as a single piece with the bottom plate 50. For example, they belong to one and the same piece made by moulding.

In this illustrative example, a protective wall 84 extends along each side partition of a piece 82. The part 22 therefore here includes four walls 84.

Preferably, the protection walls 84 are made of a gasogenic material. The term "gasogenic material" refers to a material which generates a cooling gas, such as hydrogen, when this material is raised to a high temperature, for example a temperature higher than or equal to 800° C. The cooling gas generated by the gasogenic material promotes the extinction of the electric arc. The gasogenic material is here a synthetic material, such as a polyamide, for example a polyamide PA 6.6, preferably enriched with glass fibres.

Advantageously, the protection walls 84 include a folded-over edge 86 which covers and surrounds the end edges of the insulating wall 80 over their entire height. More specifically, each edge 86 is formed as a single piece with the corresponding wall 84, and extends beyond the inner face of the side partition, as a prolongation that is folded back with respect thereto, so as to cover a part of the outer face of this insulating wall 80. In this example, since the end edges extend in parallel to the axis X', then the folded-over edges 86 surround these edges around a direction that is parallel to the axis X'.

The folded-over edges 86 improve the effectiveness of the protection walls 84. In particular, they further improve tightness with respect to the breaking gases.

By forming the protection walls 84 as a single piece with the bottom plate 50, the tightness of these protection walls 84, as well as the tightness of the insulating walls 80, in particular level with the joint between the attached piece 82 and the bottom plate 50, is improved. In this way, the risk of uncooled breaking gases escaping from the arc extinguishing chamber and spreading throughout the device 2 is limited. Conversely, by virtue of this improved tightness, the breaking gases are removed via the removal channels 74, and are therefore better cooled. This limits the risk of loopback of an electric current outside the removable element 6. The safety and the reliability of the device 2 are therefore improved.

This design is particularly advantageous when the housing parts 20, 22 can be separated from one another. Specifically, such separability places architectural constraints on the removable element 6, thereby decreasing the tightness of the housing. The use of such protection walls 84 therefore allows the removable element 6 to be reversibly opened without this possibility of being opened increasing the risk of breaking gases escaping.

Because the protection walls 84 are formed as a single piece with the bottom plate 50, they are made at the same time as the bottom plate 50, for example in one and the same moulding operation. The rear part 22 is therefore simpler to make than if these protection walls 84 were produced by attaching additional pieces to the bottom plate 50. The removable element 6 is therefore simpler to manufacture on an industrial scale.

The embodiments and the variants contemplated above may be combined with one another so as to create new embodiments.

The invention claimed is:

1. A removable electric current switching element, comprising:
    a housing provided with a first bottom plate and a second bottom plate which are opposite one another;
    fixed electrical contacts, which are rigidly connected to the first bottom plate;
    electrically mobile contacts movable with respect to the fixed electrical contacts, said mobile contacts being borne by a movable contact holder movable in translation with respect to the second bottom plate;
    the housing comprising insulating walls which extend around the electrically mobile contacts from the second bottom plate and along a direction perpendicular to the second bottom plate;
    wherein the housing further includes protection walls which at least partially cover inner faces of the insulating walls, said protection walls being formed as a single piece with the second bottom plate, and
    wherein the protection walls include folded-over edges which surround the ends of the insulating walls along the direction perpendicular to the second bottom plate such that the protection wall at least partially covers the inner faces of the insulating walls and covers a portion of outer faces of the insulating walls.

2. The removable switching element according to claim 1, wherein the housing includes a first part and second part which are distinct from one another, the first housing part including the first bottom plate, the second housing part including the second bottom plate and accommodating a movable bridge, the first and second housing parts being able to be separated from one another.

3. The removable switching element according to claim 2, wherein the first and second housing parts can be separated and include complementary attachment members for rigidly connecting the first and second housing parts to one another.

4. The removable switching element according to claim 2, wherein the second housing part includes a guiding portion which allows the movable contact holder to move in translation, the guiding portion including a rectilinear window made in a side wall of the first housing part and including at least one hook borne by the movable bridge, said hook being inserted into the window.

5. The removable switching element according to claim 1, wherein the protection walls are made in a gasogenic material.

6. The removable switching element according to claim 1, wherein the second bottom plate contains at least one channel for removing breaking gases, which fluidically connects an inlet opening, in communication with a volume delimited by the insulating walls inside the housing, to an outlet opening, in communication with the exterior of the housing.

7. The removable switching element according to claim 1, wherein the protection walls extend over the entire height of the insulating walls, along the direction perpendicular to the second bottom plate.

8. The removable switching element according to claim 1, wherein the insulating walls are at least partly formed by a blow piece attached to the second bottom plate.

9. An electrical switchgear for switching an electric current, comprising:
    a baseplate including one or more housings; and
    the removable electric current switching element according to claim 1 accommodated in one of the housings of the baseplate, such that the fixed electrical contacts of the removable switching element are electrically connected to connection lands of the switching device.

* * * * *